US012562013B2

(12) United States Patent
Palai et al.

(10) Patent No.: US 12,562,013 B2
(45) Date of Patent: Feb. 24, 2026

(54) PARTIAL VEHICLE DIAGNOSTICS

(71) Applicant: JAGUAR LAND ROVER LIMITED, Coventry (GB)

(72) Inventors: Dibyendu Palai, Leamington Spa (GB); Sachin Shinde, Solihull (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 888 days.

(21) Appl. No.: 17/639,173

(22) PCT Filed: Aug. 27, 2020

(86) PCT No.: PCT/EP2020/073954
§ 371 (c)(1),
(2) Date: Feb. 28, 2022

(87) PCT Pub. No.: WO2021/037968
PCT Pub. Date: Mar. 4, 2021

(65) Prior Publication Data
US 2022/0270415 A1 Aug. 25, 2022

(30) Foreign Application Priority Data

Aug. 30, 2019 (GB) ...................................... 1912488
Sep. 2, 2019 (GB) ...................................... 1912568

(51) Int. Cl.
*B60W 50/04* (2006.01)
*B60W 50/00* (2006.01)
(Continued)

(52) U.S. Cl.
CPC ........... *G07C 5/0808* (2013.01); *B60W 50/04* (2013.01); *G07C 5/008* (2013.01); *G07C 5/0816* (2013.01);
(Continued)

(58) Field of Classification Search
CPC .... G07C 5/0808; G07C 5/008; G07C 5/0816; B60W 50/04; B60W 2050/0006;
(Continued)

(56) References Cited

U.S. PATENT DOCUMENTS

| | | | |
|---|---|---|---|
| 6,330,499 | B1 | 12/2001 | Chou et al. |
| 6,766,230 | B1 | 7/2004 | Rizzoni et al. |

(Continued)

FOREIGN PATENT DOCUMENTS

| | | |
|---|---|---|
| CN | 104236913 A | 12/2014 |
| CN | 105083168 A | 11/2015 |

(Continued)

OTHER PUBLICATIONS

Merged Copies of PE2E English Translation and Foreign KR_102313599_B1 (Year: 2021).*

(Continued)

*Primary Examiner* — James J Lee
*Assistant Examiner* — Andrew Sang Kim
(74) *Attorney, Agent, or Firm* — Troutman Pepper Locke LLP; Dustin B. Weeks; Nicholas H. Doss

(57) ABSTRACT

The present disclosure relates to a control system (2) for a vehicle. The control system is configured to receive a request to initiate a diagnostic conversation, and attempt to initiate the requested diagnostic conversation while the vehicle is in a sleep state. The control system is further configured to determine one or more target participants that are required for participation in a requested diagnostic conversation, to determine an on-board energy status of the vehicle, and to energise the target participants without energising the entire vehicle and initiate the requested diagnostic conversation in dependence on the on-board energy status of the vehicle being sufficient to conduct the requested diagnostic conversation.

19 Claims, 2 Drawing Sheets

(51) Int. Cl.
    *G07C 5/00*          (2006.01)
    *G07C 5/08*          (2006.01)
(52) U.S. Cl.
    CPC ............... *B60W 2050/0006* (2013.01); *B60W 2050/041* (2013.01)
(58) Field of Classification Search
    CPC ............... B60W 2050/041; B60L 3/12; G05B 23/0264; G05B 23/0275; G06F 9/4411
    See application file for complete search history.

(56)                References Cited

U.S. PATENT DOCUMENTS

| | | | | |
|---|---|---|---|---|
| 9,188,505 | B2 | 11/2015 | Martin | |
| 9,381,824 | B2 | 7/2016 | Tabatowski-Bush et al. | |
| 9,390,569 | B2 | 7/2016 | Kurnik et al. | |
| 2004/0078125 | A1 | 4/2004 | Woodard et al. | |
| 2009/0295559 | A1 | 12/2009 | Howell et al. | |
| 2009/0300595 | A1* | 12/2009 | Moran | G06F 8/65 |
| | | | | 717/173 |
| 2010/0057511 | A1 | 3/2010 | Mansouri | |
| 2010/0120373 | A1 | 5/2010 | Wheatley | |
| 2010/0127857 | A1 | 5/2010 | Kilmurray | |
| 2016/0266886 | A1* | 9/2016 | Sarkar | H04W 4/50 |
| 2018/0182184 | A1 | 6/2018 | Zoppelt et al. | |
| 2018/0232959 | A1 | 8/2018 | Thornburg et al. | |
| 2019/0066399 | A1 | 2/2019 | Jiang et al. | |
| 2019/0210545 | A1* | 7/2019 | Sangameswaran | B60R 16/033 |
| 2019/0212997 | A1 | 7/2019 | Sangameswaran et al. | |
| 2020/0057630 | A1* | 2/2020 | Cho | G06F 8/65 |
| 2020/0125355 | A1 | 4/2020 | Aust | |
| 2020/0394031 | A1* | 12/2020 | Kim | G06F 8/65 |

FOREIGN PATENT DOCUMENTS

| | | |
|---|---|---|
| CN | 105425774 A | 3/2016 |
| CN | 105471020 A | 4/2016 |
| CN | 107678415 A | 2/2018 |
| EP | 2189948 A2 | 5/2010 |
| WO | 2019009020 A1 | 1/2019 |

OTHER PUBLICATIONS

Merged PE2E English Copy and Foreign KR 102313599 B1 (Year: 2017).*

"Next-Generation Diagnostics for HPC-based Connected Vehicles", DSA; HPC Diagnostics—Proposal Workshop, Hohenkirchen, Germany, dated May 6, 2019, 30 pages.

Thomas Falschebner, "Why do we need a new Diagnostics for HPC Systems", Porsche AG; HPC Diagnostics—Proposal Workshop, Hohenkirchen, Germany, dated May 6, 2019, 8 pages.

Combined Search and Examination report corresponding to Great Britain Application No. GB1912488.2, Feb. 26, 2020, 8 pages.

Combined Search and Examination report corresponding to Great Britain Application No. GB1912568.1, Dec. 23, 2021, 5 pages.

Great Britain Office Action corresponding to Great Britain Application No. GB1912568.1, dated Dec. 23, 2021, 5 pages.

Great Britain Office Action corresponding to Great Britain Application No. GB1912488.2, dated Dec. 23, 2021, 5 pages.

International Search Report corresponding to International Application No. PCT/EP2020/073954, dated Nov. 20, 2020, 5 pages.

Written Opinion corresponding to International Application No. PCT/EP2020/073954, dated Nov. 20, 2020, 12 pages.

English translation of Chinese Office Action, corresponding to application 202080061065.0, dated May 19, 2023, 23 pages.

* cited by examiner

PARTIAL VEHICLE DIAGNOSTICS

CROSS REFERENCE TO RELATED APPLICATIONS

This application is a § 371 National Stage of International Patent Application No. PCT/EP2020/073954, with an international filing date of 27 Aug. 2020, which International Patent Application No. PCT/EP2020/073954 claims priority to UK Patent Application No. 1912568.1, filed 2 Sep. 2019, and UK Patent Application No. 1912488.2, filed 30 Aug. 2019, each of which is hereby incorporated herein by reference in its entirety as if fully set forth below.

TECHNICAL FIELD

The present disclosure relates to the initiation and control of diagnostic conversations with automotive vehicles. Aspects of the invention relate to a control system for a vehicle, to a vehicle comprising a control system, and to a method of operating a control system.

BACKGROUND

Automotive vehicles typically include a large number of sub-systems. Each sub-system is typically controlled by one or more electronic control units (ECUs), each of which is connected to a plurality of input/output (I/O) devices such as sensors and actuators that are configured to implement vehicle functions. For example, a vehicle may include a powertrain controller, a transmission controller, a brake controller, a suspension controller, door controllers and seat controllers, among many other ECUs.

From time to time it may be necessary to establish a diagnostic conversation between one or more of a vehicle's ECUs and a remote tester. This may, for example, be necessary when conducting a remote diagnostics campaign such as reading emission relevant diagnostic trouble codes (DTCs) or when performing a software-over-the-air or feature-over-the-air (SOTA/FOTA) update such as updating the appearance of an instrument panel or enabling a new vehicle function.

Diagnostic conversations may be classified as being either intrusive or non-intrusive. Diagnostic conversations such as data reading conversations that have no implication for the operation of the vehicle's application functions and sub-systems are generally classified as being non-intrusive. In contrast, diagnostic conversations such as SOTA and FOTA updates that affect the operation and functions of target sub-systems either during execution or after the routine has been completed are generally classified as being intrusive.

Intrusive and non-intrusive diagnostic conversations generally require the vehicle to be fully powered up so that the vehicle's ECUs and sensors/actuators are available to participate in the diagnostic conversation. In addition, some diagnostic conversations are performed via a wired interface and require the physical presence of a maintenance person.

The need for a vehicle to be in the presence of a maintenance person or at least powered up by the vehicle's owner in order to enable diagnostic conversations to be conducted obviously causes inconvenience to vehicle users. In addition, prolonged diagnostic conversations can lead to a significant drain of a vehicle's on-board energy system, which may result in degraded battery performance over time and reduced battery life, as well as causing further inconvenience to vehicle users.

It is an aim of the present invention to address disadvantages associated with the prior art.

SUMMARY OF THE INVENTION

According to an aspect of the present invention there is provided a control system for a vehicle, the control system comprising one or more controllers for initiating and controlling diagnostic conversations, wherein the control system is configured to: receive a request to initiate a diagnostic conversation, and attempt to initiate the requested diagnostic conversation while the vehicle is in a sleep state; determine one or more target participants that are required for participation in the requested diagnostic conversation; determine an on-board energy status of the vehicle; and energise the target participants without energising the entire vehicle and initiate the requested diagnostic conversation in dependence on the on-board energy status of the vehicle being sufficient to conduct the requested diagnostic conversation.

The request to initiate the diagnostic conversation may be generated by and received from an off-board or remote tester that is configured to conduct diagnostic conversations with the vehicle. The remote tester may, for example, be an off-board backend server, which may be controlled by the original equipment manufacturer (OEM). The off-board backend server may be configured to communicate with the vehicle directly via an on-board tester and/or via an off-board communication device such as a dongle. Alternatively, the remote tester may be an off-board device such as a dongle that is physically connected to the vehicle.

It will be appreciated that the term "target participants" refers to devices of the vehicle that are to be included in a requested diagnostic conversation. The target participants will generally include one or more I/O interface modules such as ECUs together with one or more I/O devices such as sensors and/or actuators. The target participants may be specified individually, or alternatively as target sub-systems including multiple individual devices.

By enabling diagnostic conversations to be initiated while the vehicle is in a sleep state, the control system of the present invention allows diagnostic conversations that are required for example by remote diagnostics campaigns and SOTA/FOTA operations to be performed while the vehicle is in the possession of an end user without requiring the physical presence of a maintenance person, and without waiting for the vehicle to be switched on. The present invention therefore allows remote diagnostic campaigns and SOTA/FOTA operations to be initiated remotely and carried out with minimal disruption to vehicle users.

In addition, since the control system of the present invention is configured to only energise a sub-set of the devices of the vehicle (i.e. the devices that have been identified as being required for participation in a requested diagnostic conversation), the control system of the present invention is able to carry out diagnostic conversations from a sleep state without requiring the entire vehicle and its various sub-systems to be fully energised. In this way the power drain caused by performing remote diagnostic campaigns and SOTA/FOTA operations may be greatly reduced, thereby further minimising disruption to vehicle users, and preventing premature degradation of battery performance.

The control system may be configured to select the one or more target participants in dependence on the diagnostic conversation specified in the received request. In this case the control system may comprise a database that stores lists of target participants that are required for different diagnostic conversations.

Alternatively, or in addition, the control system may be configured to receive an indication of the required target participants together with the request to initiate a diagnostic conversation.

The control system may be configured to determine whether or not the on-board energy status of the vehicle is sufficient to conduct a requested diagnostic conversation in dependence on the identities of the target participants. Alternatively, or in addition, the control system may be configured to determine whether or not the on-board energy status of the vehicle is sufficient to conduct a requested diagnostic conversation in dependence on a time and/or energy requirement for the requested diagnostic conversation.

The control system may be configured to determine a revised diagnostic conversation if the on-board energy status of the vehicle is not sufficient to conduct the originally-requested diagnostic conversation. The revised diagnostic conversation may involve a revised selection of target participants and/or a revised set of operations. The revised selection of target participants and/or revised set of operations may be generated locally by the control system, or alternatively may be generated externally and communicated to the control system, for example by the remote tester that generated the original request to initiate a diagnostic conversation. This process may be repeated until an acceptable diagnostic conversation is established. In this way it may be possible to carry out a reduced version of a remote diagnostic campaign or SOTA/FOTA operation even if the vehicle does not have sufficient energy to conduct the full operation as originally requested.

The control system may be configured to generate a keep alive interface in order to maintain the vehicle in a diagnostics vehicle state while the diagnostic conversation is in progress. The control system may be configured to terminate the keep alive interface thereby allowing the vehicle to return to the sleep mode upon completion of a diagnostic conversation. The control system may also be configured to detect faults in a diagnostic conversation, and to terminate the keep alive interface upon detection of a fault. In this way the control system may be able to minimise power drain following the completion of a diagnostic conversation, and ensure fail-safe behaviour in the event of a fault.

The control system may comprise a vehicle diagnostics manager (VDM) and a vehicle lifecycle manager (VLM). The VDM may be configured to initiate and control diagnostic conversations. The VLM may be configured to monitor and control the power state of the vehicle. The VDM may be configured to send a request to operate signal to the vehicle lifecycle manager upon receiving the request to initiate a diagnostic conversation. The request to operate signal may identify the one or more target participants that are required for participation in the requested diagnostic conversation. The VLM may be configured to grant or deny the request to operate in dependence on the state of the vehicle's energy storage system, and optionally further in dependence on the identities of the target participants.

The control system may be configured to receive requests to initiate both intrusive and non-intrusive diagnostic conversations.

The control system may be configured to accept a received request to initiate an intrusive diagnostic conversation if the vehicle is in a sleep state, and to reject a received request to initiate an intrusive diagnostic conversation if the vehicle is not in a sleep state. By preventing intrusive diagnostic conversations from being initiated when the vehicle has been switched on, the disruption to a user of the vehicle may be minimised.

The control system may be configured to perform a precondition check related to the movement state of the vehicle upon receiving a request to initiate an intrusive diagnostic conversation, and to accept the request in dependence on the precondition check being passed. The control system may, for example be configured to verify that the vehicle is stationary, locked and/or in a parked state before attempting to initiate a requested intrusive diagnostic conversation.

The control system may be configured to reject a received request to initiate a non-intrusive diagnostic conversation if the vehicle is in a sleep state, and to accept a received request to initiate a non-intrusive diagnostic conversation if the vehicle is not in a sleep state. By allowing non-intrusive diagnostic conversations to be performed only when the vehicle is awake it is possible to avoid unnecessarily energising any part of the vehicle in order to perform a diagnostic conversation that could instead be performed in the background when the vehicle is next switched on and used. However, in order to ensure that critical non-intrusive diagnostic conversations are still conducted within an acceptable time frame even if the vehicle is left unused for an extended period, the control system may additionally be configured to accept requests to initiate non-intrusive diagnostic conversations if the vehicle has been in a sleep state for a predetermined period, for example a time period of 3 days or more.

The control system may be configured to initiate a requested non-intrusive diagnostic conversation automatically without performing any further precondition checks provided that the vehicle is not in a sleep state.

If a request to initiate a diagnostic conversation is rejected, for example because the request relates to an intrusive diagnostic conversation and the vehicle is currently in an awake state, or because the request relates to an non-intrusive diagnostic conversation and the vehicle is currently in a sleep state, then the control system will not attempt to initiate the requested diagnostic conversation when the request is received. However, the control system may be configured to schedule requested diagnostic conversations that are initially rejected for processing at a later point in time. In this way a requested intrusive diagnostic conversation that is initially rejected may subsequently be carried out the next time the vehicle enters a sleep state, and a requested non-intrusive diagnostic conversation that is initially rejected may subsequently be carried out the next time the vehicle enters an awake state.

A further aspect of the present invention provides an automotive vehicle comprising a control system as described above.

According to a further aspect of the present invention there is provided a method of initiating a diagnostic conversation for a vehicle, the method comprising: generating a request to initiate a diagnostic conversation while the vehicle is in a sleep state; determining one or more target participants that are required for participation in the requested diagnostic conversation; determining an on-board energy status of the vehicle; and, in dependence on the on-board energy status of the vehicle being sufficient to conduct the requested diagnostic conversation, energising the target participants from the sleep state without energising the entire vehicle and initiating the requested diagnostic conversation.

The method may be used in combination with the above-described control system, and may include any steps associated with normal operation of the above-described control system.

According to a further aspect of the present invention there is provided a control system for a vehicle, the control system comprising one or more controllers for initiating and controlling diagnostic conversations; wherein the control system is configured to receive requests to initiate intrusive and non-intrusive diagnostic conversations; wherein, upon receiving a request to initiate a non-intrusive diagnostic conversation, the control system is configured to reject the request if the vehicle is in a sleep state, and to accept the request if the vehicle is not in a sleep state; and wherein, upon receiving a request to initiate an intrusive diagnostic conversation, the control system is configured to accept the request if the vehicle is in a sleep state, and to reject the request if the vehicle is not in a sleep state.

If the request is accepted then the control system will attempt to initiate the requested intrusive or non-intrusive diagnostic conversation. However, it will be appreciated that a request being accepted may not always result in the requested diagnostic conversation being carried out, for example if the vehicle has insufficient energy to carry out the requested diagnostic conversation or if another precondition for carrying out the requested diagnostic conversation is not satisfied.

If, on the other hand, the request is rejected then the control system will not attempt to initiate the requested diagnostic conversation when the request is received. However, as described above in connection with the first aspect of the present invention, the control system may be configured to schedule requested diagnostic conversations that are initially rejected for processing at a later point in time.

By accepting requests to initiate intrusive diagnostic conversations when the vehicle is in a sleep state, the control system of the present invention allows intrusive diagnostic conversations that are required for example by remote diagnostics campaigns and SOTA/FOTA operations to be performed while the vehicle is in the possession of an end user without requiring the physical presence of a maintenance person, and without waiting for the vehicle to be switched on. The present invention therefore allows remote diagnostic campaigns and SOTA/FOTA operations to be initiated remotely and carried out with minimal disruption to vehicle users.

In addition, by rejecting requests for non-intrusive diagnostic conversations when the vehicle is in a sleep state and instead waiting until the vehicle is next woken up to accept such requests, the control system of the present invention also avoids unnecessarily energising any part of the vehicle in order to perform a diagnostic conversation that could instead be performed in the background when the vehicle is next switched on and used.

As mentioned above, the control system may generally be configured to reject requests to initiate non-intrusive diagnostic conversations while the vehicle is in a sleep state. However, the control system may be configured to apply exceptions under certain circumstances. For example, the control system may be configured to accept requests to initiate non-intrusive diagnostic conversations if the vehicle has been in a sleep state for a predetermined period, for example a time period of 3 days or more. In this way it may be possible to ensure that critical non-intrusive diagnostic conversations are still conducted within an acceptable time frame even if the vehicle is left unused for an extended period.

The control system may be configured to categorise a diagnostic conversation specified in a received request as being intrusive or non-intrusive, and to process the request in dependence on the generated categorisation of the requested diagnostic conversation. In this case the control system may comprise a database that stores categorisation data for different diagnostic conversations.

Alternatively, or in addition, the control system may be configured to receive an indication of whether a requested diagnostic conversation is intrusive or non-intrusive together with the received request, and to process the request in dependence on the received categorisation of the requested diagnostic conversation.

It will be appreciated that the control system may also be a control system as described above in connection with the first aspect of the present invention, and that the control system may further include any or all of the additional features described above in connection with the first aspect of the present invention. For example, the control system may be configured to perform a precondition check related to the movement state of the vehicle upon receiving a request to initiate an intrusive diagnostic conversation, and to accept the request in dependence on the precondition check being passed. In addition, the control system may be configured to initiate a requested non-intrusive diagnostic conversation automatically without performing any further precondition checks provided that the vehicle is not in a sleep state.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
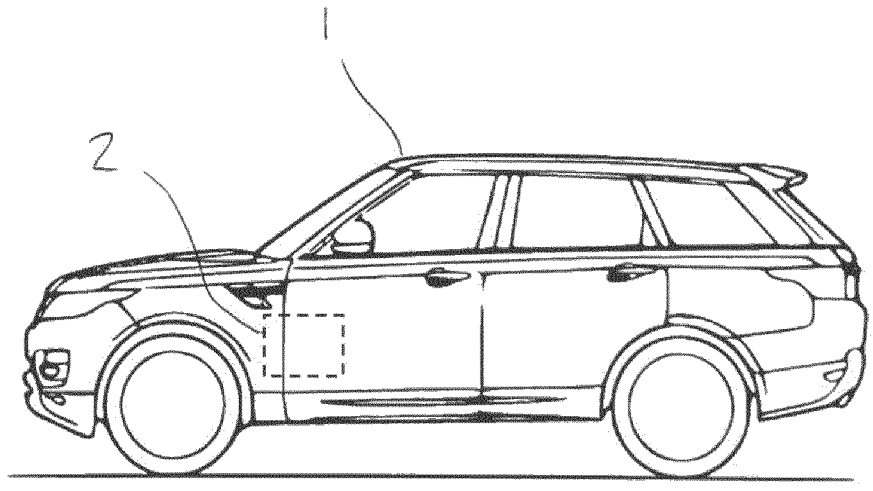
FIG. 1 schematically illustrates a road vehicle comprising a control system in accordance with one possible embodiment of the present invention, and FIG. 2 schematically illustrates a simplified version of a portion of the vehicle's overall control system.
Figure 2:
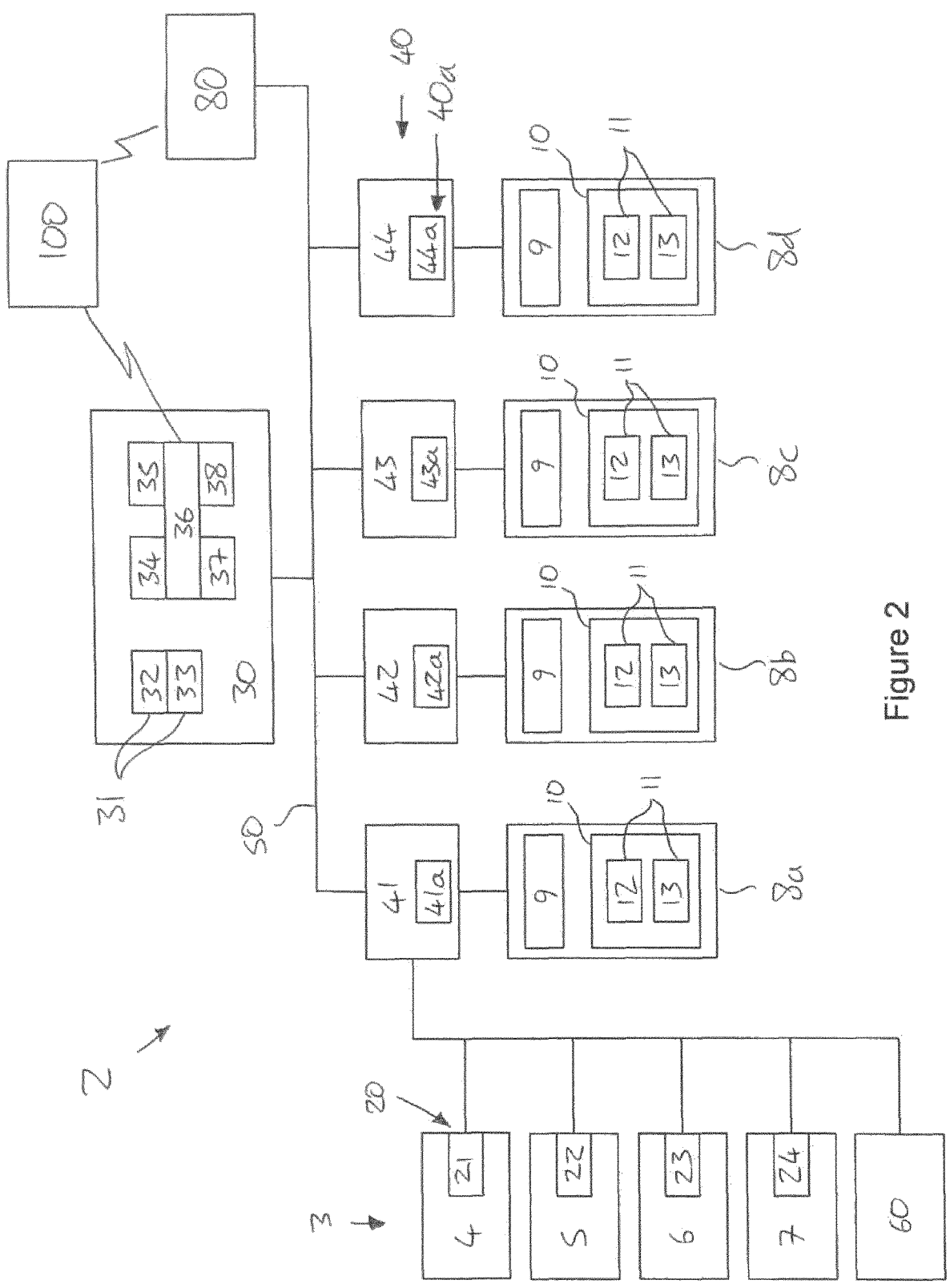

FIG. 1 schematically illustrates a road vehicle 1 comprising a control system 2 in accordance with one possible embodiment of the present invention. A simplified version of a portion of the vehicle's overall control system 2 is schematically illustrated in FIG. 2.

The vehicle 1 comprises a large number of different sub-systems 3. These sub-systems 3 include, for example, a powertrain system 4, a transmission system 5, a braking system 6, an instrument panel cluster 7, a front left seat 8a, a front right seat 8b, a rear left seat 8c, a rear right seat 8d, and a battery system 60. Each vehicle seat further comprises a respective seat position adjustment system 9 for adjusting the position of the seat and a seat massage system 10 for providing a massage to an occupant of the seat. It will be appreciated that the vehicle 1 further comprises a large number of other sub-systems in addition to those described above. However, these have been omitted from FIG. 2 for clarity.

Each of these sub-systems 3 comprises a plurality of I/O devices 11 such as sensors and actuators that are required in order for the sub-systems 3 to be able to deliver their intended functions. For example, each seat massage system 10 comprises at least one input device 12 such as a control panel for receiving user input and at least one output device 13 such as a pneumatic pump for delivering a massage to a seat occupant. It will be appreciated that the other sub-systems illustrated in FIG. 2 also include their own respective I/O devices. However, these have been omitted from FIG. 2 for clarity.

Each sub-system of the vehicle is controlled by one or more application functions. Some of the application functions are hosted locally on sub-system specific ECUs distributed throughout the vehicle. However, other application functions are hosted centrally on a central feature hosting module or central compute platform (CCP) 30.

For example, the application functions for controlling operation of the powertrain system 4 are hosted locally on a powertrain control module (PCM) 21, the application functions for controlling operation of the transmission system 5 are hosted locally on transmission control module (TCM) 22, the application functions for controlling operation of the braking system 6 are hosted locally on an antilock braking system (ABS) controller 23, and the application functions for controlling operation of instrument panel cluster 7 are hosted locally on an instrument panel cluster (IPC) controller 24. Each of the above-mentioned ECUs also hosts I/O drivers for and facilitates communication with the I/O devices of its respective sub system.

In contrast, the application functions 31 for controlling operation of the vehicle's seats are hosted centrally on the CCP 30. For example, the CCP hosts a seat position application function 21 for controlling operation of the respective seat position adjustment systems 9 and a seat massage application function 33 for controlling operation of the respective seat massage systems 10 for each of the vehicle's seats 8*a*, 8*b*, 8*c*, 8*d*.

For sub-systems 3 that are controlled by application functions 31 that are hosted centrally on the CCP 30, it is still necessary to provide local controllers closer to these sub-systems 3 than the CCP 30, for example in order to facilitate communication with I/O devices and run component-level diagnostic tests or fault monitors. For this reason the vehicle 1 is further provided with a set of four remote input/output concentrator modules or RIOs 40, each of which hosts drivers 40*a* for and is configured to facilitate communication with I/O devices 11 of various different sub-systems 3 of the vehicle 1.

In particular, the vehicle 1 comprises a front left RIO 41 that hosts drivers 41*a* for and is configured to facilitate communication with the I/O devices of the front left seat 8*a*, a front right RIO 42 that hosts drivers 42*a* for and is configured to facilitate communication with the I/O devices of the front right seat 8*b*, a rear left RIO 43 that hosts drivers 43*a* for and is configured to facilitate communication with the I/O devices of the rear left seat 8*c*, and a rear right RIO 44 that hosts drivers 44*a* for and is configured to facilitate communication with the I/O devices of the rear right seat 8*d*. It will be appreciated that the front left, front right, rear left and rear right RIOs may further also host drivers for and facilitate communication with I/O devices for other vehicle sub-systems besides those shown in FIG. 2.

The RIOs 40 are each connected to the CCP 30 via a backbone link or wiring harness 50 of the vehicle 1. The backbone link or wiring harness 50 may, for example, provide an Ethernet or FlexRay link between the RIOs 40 and the CCP 30. In the example shown in FIG. 2 the PCM 21, TCM 22, ABS controller 23 and IPC controller 24 are also connected to the backbone link or wiring harness 50 via the front left RIO 41. However, in other cases the PCM 21, TCM 22, ABS controller 23 and IPC controller 24 could alternatively be connected to the backbone link or wiring harness 50 individually or via a separate RIO. It will be appreciated that the vehicle's overall control system 2 may also include many other ECUs 20 and/or RIOs 40, which may be connected to each other and to the backbone link or wiring harness 50 in any suitable arrangement.

As shown in FIG. 2, the CCP 30, as well as hosting application functions 31, also hosts various other control modules, including a vehicle diagnostics manager (VDM) 34, a lifecycle manager (VLM) 35, an on-board tester 36, a diagnostics server 37 and a diagnostics database 38.

The VDM 34 is configured to receive remotely-generated requests to initiate diagnostic conversations with the vehicle from an OEM-controlled off-board backend server 100, for example when the vehicle 1 is required to participate in a remote diagnostics campaign or receive a SOTA/FOTA update. The off-board backend server 100 may transmit requests to initiate diagnostic conversations directly to the vehicle via the vehicle's on-board tester 36, or alternatively via an off-board dongle tester 80 which may be physically connected to the vehicle using an OBD J1962 connector. The VDM 34 is further configured to initiate and control diagnostic conversations upon request, subject to certain conditions being satisfied, as described in more detail below.

The VLM 35 is configured to monitor various different vehicle and system states including battery system state, powertrain system state, vehicle lock state and vehicle movement state in order to determine and control the overall power state of the vehicle. The VLM 35 is also configured to provide various services to other control modules in the vehicle's overall control system 2. In particular, the VLM 35 is configured to monitor the change state and health state of the vehicle's battery system 60 in order to determine the on-board energy status of the vehicle 1, and to make the on-board energy status available to other control modules. The VLM 35 is further configured to grant or deny requests to perform various different actions from other control modules in dependence on the on-board energy status of the vehicle 1, as described in more detail below.

The manner in which the vehicle's control system 2 is configured to initiate and control diagnostic conversations with the off-board backend server 100 will now be described with reference to FIG. 2.

When a remote tester such as an external dongle 80 or an off-board backend server 100 transmits a request to initiate a diagnostic conversation to the vehicle 1, for example in connection with a remote diagnostics campaign or SOTA/FOTA update, the request to initiate the diagnostic conversation is received by the VDM 34. The VDM 34 first determines whether the request relates to an intrusive diagnostic conversation or to a non-intrusive diagnostic conversation. This information may be communicated to the VDM 34 together with the request to initiate the diagnostic conversation. However, the VDM 34 may also be configured to categorise a diagnostic conversation specified in a received request as being intrusive or non-intrusive, for example by consulting a database that stores categorisation data for different diagnostic conversations.

The VDM 34 then notifies the VLM 35 of the request to initiate an intrusive or non-intrusive diagnostic conversation, and the VLM 35 determines whether to accept or reject the received request. The VLM 35 is configured to accept requests to initiate intrusive diagnostic conversations if the vehicle 1 is in a sleep state (for example if the vehicle 1 has been switched off and powered down) and the vehicle 1 is also stationary and in a locked or parked state; and to reject requests to initiate intrusive diagnostic conversations in other vehicle states. In contrast, the VLM 35 is configured to accept requests to initiate non-intrusive diagnostic conversations if the vehicle 1 in an awake state (for example if the vehicle 1 has been switched on) or if the vehicle 1 has been in a sleep state continuously for a time period of at least three days; and to reject requests to initiate non-intrusive diagnostic conversations in other vehicle states.

If a request to initiate a diagnostic conversation is accepted then the VDM 34 will next determine which particular ECUs 20, RIOs 40 and I/O devices 11 are required for participation in the requested diagnostic conversation. The VDM 34 may also be configured to determine a time and/or energy requirement for the requested diagnostic conversation. The desired target participants (and optionally also the time and/or energy requirement) may be communicated to the VDM 34 together with the request to initiate the diagnostic conversation. However, the VDM 34 may also be configured to select the target participants (and optionally also the time and/or energy requirement) in dependence on the diagnostic conversation specified in the received request, for example by consulting a database that stores participant and time/energy requirement data for different diagnostic conversations.

In the case of a request to initiate a non-intrusive diagnostic conversation that is received while the vehicle 1 is in an awake state, once the request has been accepted by the VLM 35, the VDM 34 is then free to initiate the requested diagnostic conversation with the target participants using the on-board tester 36 (or alternatively the off-board dongle tester 80, if present). The target participants are then able to communicate with the off-board backend server 100 as required in order for the non-intrusive diagnostic conversation to be completed.

However, in the case of a request to initiate an intrusive diagnostic conversation that is received while the vehicle 1 is in a sleep state (or a request to initiate a non-intrusive diagnostic conversation that is received while the vehicle 1 has been in a sleep state continuously for at least three days), the VDM 34 is not yet able to initiate the requested diagnostic conversation upon acceptance of the request because the vehicle 1 is still in a sleep state and the target participants that are required for participation in the requested conversation are not energised.

In this case, the VDM 34 is configured to send a request to operate signal to the VLM 35 requesting permission to initiate the requested diagnostic conversation from a sleep state. The request to operate specifies the target participants required for participation in the requested diagnostic conversation, and may also specify the time and/or energy requirement for the requested diagnostic conversation. The VLM 35 then compares the list of target participants (or alternatively the time and/or energy requirement) to the on-board energy status of the vehicle 1 (including the charge state and health state of the vehicle's battery system 60) in order to determine whether or not the on-board energy status of the vehicle 1 is sufficient to conduct the requested diagnostic conversation.

If it is determined that the on-board energy status of the vehicle 1 is sufficient to conduct the requested diagnostic conversation then the VLM 35 is configured to energise the target participants without powering up the entire vehicle 1. The VLM 35 is also configured to latch the vehicle 1 in a diagnostics state, in which a keep alive interface is used to keep the target participants energised while the diagnostic conversation is in progress.

Once the target participants have been energised, the VLM 35 is configured to hand control of the diagnostic conversation over to the VDM 34, which is then free to initiate the requested diagnostic conversation with the target participants using the on-board tester 36 (or off-board dongle tester 80). The target participants are then able to communicate with the off-board backend server 100 as required in order for the requested diagnostic conversation to be completed.

Once the requested diagnostic conversation has been completed, the VDM 34 is configured to terminate the keep alive interface between the VDM 34 and the VLM 35, indicating that the requested diagnostic conversation has been completed. Upon termination of the keep alive interface, the VLM 35 is configured to initiate power down for the target devices that were energised for participation in the diagnostic conversation, and to return the vehicle 1 to a sleep state. The keep alive interface may also be terminated early if a serious fault is detected in the diagnostic conversation.

If, on the other hand, it is determined that the on-board energy status of the vehicle 1 is not sufficient to conduct the requested diagnostic conversation then the VLM 35 is configured to report to the VDM 34 that the request to operate has been denied due to an insufficient on-board energy status. In turn, the VDM 34 is configured to report to the off-board backend server 100 that the request to initiate a diagnostic conversation has been denied due to an insufficient on-board energy status. The off-board backend server 100 may then respond by issuing a new request to initiate a different diagnostic conversation, which may include a reduced number of target participants and/or a reduced number of operations. The revised request may then be processed in a similar manner to the initial request. This process may be repeated a number of times if necessary until an acceptable diagnostic conversation is established or else it is established that no version of the originally requested diagnostic conversation can take place based on the current on-board energy status of the vehicle 1.

In order to further aid understanding of possible applications of the present invention, the process of initiating several specific diagnostic conversations will now be described.

As a first example, the OEM-controlled off-board backend server 100 may periodically attempt to initiate a diagnostic conversation with the vehicle 1 in order to read emission relevant DTCs from all legislative OBD ECUs 20 of the vehicle 1, including the PCM 21, TCM 22 and ABS controller 23.

If the vehicle 1 is in an awake state when the request is received from the off-board backend server 100 then the request will be accepted since the request relates to a non-intrusive diagnostic conversation which may be carried out in the background while the vehicle 1 is in use. If, on the other hand, the vehicle 1 is in a sleep state when the request is received, then the request will be rejected unless the vehicle 1 has been in a sleep state for a continuous period of at least three days.

If the request is accepted while the vehicle is in a sleep state (for example because the vehicle 1 has been in a sleep state for a continuous period of at least three days) then the VDM 34 will send a request to operate signal to the VLM 35 indicating that all legislative OBD ECUs 20 of the vehicle 1 are required for participation in a diagnostic conversation. The VLM 35 will then compare the list of target participants to the charge state and health state of the vehicle's battery system 60 in order to determine whether or not the on-board energy status of the vehicle 1 is sufficient to sustain a diagnostic conversation including all legislative OBD ECUs 20 of the vehicle 1. If it is determined that the on-board energy status is sufficient then the VLM 35 will energise all legislative OBD ECUs 20 of the vehicle 1 and latch the vehicle 1 into a diagnostics state before handing control over to the VDM 34 so that the requested diagnostic conversation can proceed as originally requested.

If, on the other hand, it is determined that the on-board energy status is not sufficient then the VLM 35 will report to the VDM 34 that the request to operate has been denied due to insufficient on-board energy. The VDM 34 will then report the denial to the off-board backend server 100.

The off-board backend server 100 may then respond by transmitting a new request to the vehicle 1 to read emission relevant DTCs from a smaller selection of ECUs 20, for example from the PCM 21 only. In this case the diagnostic conversation may then be permitted to proceed based on the revised request if the on-board energy is sufficient to sustain a diagnostic conversation with the PCM 21 only, with the full data read operation being conducted at a later time when on-board energy is sufficient to complete the originally requested diagnostic conversation.

As a further example, if an owner of the vehicle 1 pays to unlock an additional feature such as in-seat massage then the off-board backend server 100 may attempt to initiate a diagnostic conversation with the vehicle 1 in order to unlock the additional feature via a FOTA update. If it is desired to apply this feature to all of the vehicle's seats 8a, 8b, 8c, 8d then it may be necessary to run control routines involving the I/O devices 11 and drivers 41a, 42a, 43a, 44a for all four of the seat massage systems 10. In this case the request as received from the off-board backend server 100 may specify all four RIOs 41, 42, 43, 44, all four seat control panels 12 and all four pneumatic pumps 13 as target participants for the desired diagnostic conversation.

If the vehicle 1 is not in a sleep state (for example if the vehicle 1 is currently in use) when the request is received from the off-board backend server 100 then the request will be rejected since the request relates to an intrusive diagnostic conversation. In this case the requested update will not be processed when the request is received, although it may be scheduled for processing at a subsequent time. If, on the other hand, the vehicle 1 is in a sleep state when the request is received then the VDM 34 will send a request to operate signal to the VLM 35 indicating that all four RIOs 41, 42, 43, 44, all four seat control panels 12 and all four pneumatic pumps 13 are required for participation in a diagnostics conversation.

The VLM 35 will then compare the list of target participants to the charge state and health state of the vehicle's battery system 60 in order to determine whether or not the on-board energy status of the vehicle 1 is sufficient to sustain a diagnostic conversation including the requested target participants. If it is determined that the on-board energy status is sufficient then the VLM will energise all four RIOs 41, 42, 43, 44, all four seat control panels 12 and all four pneumatic pumps 13. The VLM 35 will then latch the vehicle 1 into a diagnostics state before handing control over to the VDM 34 so that the in-seat massage feature can be unlocked for all vehicle seats 8a, 8b, 8c, 8d.

If, on the other hand, it is determined that the on-board energy status is not sufficient then the VLM 35 will report to the VDM 34 that the request to operate has been denied due to insufficient on-board energy. The VDM 34 will then report the denial to the off-board backend server 100.

The off-board backend server 100 may then respond by transmitting a new request to the vehicle 1 to unlock the in-seat massage feature for the driver's seat only, specifying only the RIO 40, seat control panel 12 and pneumatic pump 13 of the drivers seat. In this case the diagnostic conversation may then be permitted to proceed based on the revised request if the on-board energy is sufficient to sustain a diagnostic conversation with the RIO 40, seat control panel 12 and pneumatic pump 13 of the drivers seat. The in-seat massage feature may subsequently be unlocked for the remaining seats at a later time when on-board energy is sufficient to complete the originally requested diagnostic conversation.

As a final example, the OEM-controlled off-board backend server 100 may periodically attempt to initiate a diagnostic conversation with the vehicle 1 in order to deliver SOTA updates, for example in order to apply a software image update to the instrument panel cluster 7. In this case the request as received from the off-board backend server 100 may specify the IPC controller 24 and instrument panel 7 as target participants for the desired diagnostic conversation, as well as the expected time and/or energy required for the desired diagnostic conversation.

If the vehicle 1 is not in a sleep state (for example if the vehicle 1 is currently in use) when the request is received from the off-board backend server 100 then the request will be rejected since the request relates to an intrusive diagnostic conversation. In this case the requested update will not be processed when the request is received, although it may be scheduled for processing at a subsequent time. If, on the other hand, the vehicle 1 is in a sleep state when the request is received then the VDM 34 will send a request to operate signal to the VLM 35 indicating that the IPC controller 24 and instrument panel 7 are required for participation in a diagnostics conversation and further indicating the expected time and/or energy required for the desired diagnostic conversation.

The VLM 35 will then compare the list of target participants and the expected time and/or energy to the charge state and health state of the vehicle's battery system 60 in order to determine whether or not the on-board energy status of the vehicle 1 is sufficient to conduct the requested diagnostic conversation. If it is determined that the on-board energy status is sufficient then the VLM 35 will energise the IPC controller 24 and instrument panel 7. The VLM 35 will then latch the vehicle 1 into a diagnostics state before handing control over to the VDM 34 so that the requested software update can be applied.

If, on the other hand, it is determined that the on-board energy status is not sufficient then the VLM 35 will report to the VDM 34 that the request to operate has been denied due to insufficient on-board energy. The VDM 34 will then report the denial to the off-board backend server 100.

The off-board backend server 100 may then respond by transmitting a new request to apply a partial software update including only some of the originally intended files, together with a lower estimated time and/or energy requirement. In this case the diagnostic conversation may then be permitted to proceed based on the revised request if the on-board energy is sufficient to conduct the reduced diagnostic conversation required for applying the partial software update. The full software update may subsequently be performed at a later time when on-board energy is sufficient to complete the originally requested diagnostic conversation.

The above description of one- or more exemplary embodiments has been included in order to aid understanding of the present invention. However, it will be appreciated that many modifications may be made to the above examples without departing from the scope of the present invention as defined in the accompanying claims.

The invention claimed is:

1. A control system for a vehicle, the control system comprising one or more controllers for initiating and controlling diagnostic conversations, wherein the control system is configured to:
    receive a request to initiate a diagnostic conversation, categorise the diagnostic conversation specified in the received request as being intrusive or non-intrusive and attempt to initiate the requested diagnostic conversation in dependence on the category of the diagnostic conversation and whether the vehicle is in a sleep state;
    determine one or more target participants that are required for participation in the requested diagnostic conversation;
    determine an on-board energy status of the vehicle; and
    energise the target participants without energising the entire vehicle and initiate the requested diagnostic conversation in dependence on the on-board energy status of the vehicle being sufficient to conduct the requested diagnostic conversation.

2. The control system according to claim 1, wherein the control system is configured to select the one or more target participants in dependence on the diagnostic conversation specified in the received request.

3. The control system according to claim 1, wherein the control system is configured to receive an indication of the required target participants together with the request to initiate a diagnostic conversation.

4. The control system according to claim 1, wherein the control system is configured to determine whether or not the on-board energy status of the vehicle is sufficient to conduct a requested diagnostic conversation in dependence on identities of the target participants.

5. The control system according to claim 1, wherein the control system is configured to determine whether or not the on-board energy status of the vehicle is sufficient to conduct a requested diagnostic conversation in dependence on a time and/or energy requirement for the requested diagnostic conversation.

6. The control system according to claim 1, wherein the control system is configured to determine a revised diagnostic conversation when the on-board energy status of the vehicle is not sufficient to conduct the originally-requested diagnostic conversation.

7. The control system according to claim 1, wherein the control system is configured to generate a keep alive interface in order to maintain the vehicle in a diagnostics vehicle state while the diagnostic conversation is in progress.

8. The control system according to claim 1, wherein the control system comprises a vehicle diagnostics manager and a vehicle lifecycle manager;

wherein the vehicle diagnostics manager is configured to send a request to operate signal to the vehicle lifecycle manager upon receiving the request to initiate a diagnostic conversation; and
    wherein the vehicle lifecycle manager is configured to grant or deny the request to operate in dependence on a state of an energy storage system of the vehicle.

9. The control system according to claim 1, wherein, upon receiving a request to initiate an intrusive diagnostic conversation, the control system is configured to accept the request when the vehicle is in a sleep state, and to reject the request when the vehicle is not in a sleep state.

10. The control system according to claim 9, wherein the control system is configured to perform a precondition check related to a movement state of the vehicle upon receiving a request to initiate an intrusive diagnostic conversation, and to accept the request in dependence on the precondition check being passed.

11. The control system according to claim 1, wherein, upon receiving a request to initiate a non-intrusive diagnostic conversation, the control system is configured to reject the request when the vehicle is in a sleep state, and to accept the request when the vehicle is not in a sleep state.

12. An automotive vehicle comprising the control system according to claim 1.

13. A method of initiating a diagnostic conversation for a vehicle, the method comprising:
    generating a request to initiate a diagnostic conversation in dependence on a category of the diagnostic conversation and whether the vehicle is in a sleep state;
    determining one or more target participants that are required for participation in the requested diagnostic conversation;
    determining an on-board energy status of the vehicle; and
    in dependence on the on-board energy status of the vehicle being sufficient to conduct the requested diagnostic conversation, energising the target participants from the sleep state without energising the entire vehicle and initiating the requested diagnostic conversation.

14. A control system for a vehicle, the control system comprising one or more controllers for initiating and controlling diagnostic conversations;
    wherein the control system is configured to receive requests to initiate intrusive and non-intrusive diagnostic conversations;
    wherein the control system is further configured to:
        in response to receiving a request to initiate a non-intrusive diagnostic conversation when the vehicle is not in a sleep state, accept the request and reject the request when the vehicle is in a sleep state;
        in response to receiving a request to initiate a non-intrusive diagnostic conversation when the vehicle has been in a sleep state for a predetermined period, accept the request; and
        in response to receiving a request to initiate an intrusive diagnostic conversation when the vehicle is in a sleep state, accept the request, and to reject the request when the vehicle is not in a sleep state.

15. The control system according to claim 14, wherein the control system is configured to categorise a diagnostic conversation specified in a received request as being intrusive or non-intrusive, and to process the request in dependence on the generated categorisation of the requested diagnostic conversation.

16. The control system according to claim 14, wherein the control system is configured to receive an indication of whether a requested diagnostic conversation is intrusive or non-intrusive together with the received request, and to process the request in dependence on the received indication of the requested diagnostic conversation.

17. The control system according to claim 14, wherein the control system is configured to perform a precondition check related to a movement state of the vehicle upon receiving a request to initiate an intrusive diagnostic conversation, and to accept the request in dependence on the precondition check being passed.

18. The control system according to claim 14, wherein the control system is configured to initiate a requested non-intrusive diagnostic conversation automatically without performing any further precondition checks provided that the vehicle is not in a sleep state.

19. An automotive vehicle comprising the control system according to claim 14.

\* \* \* \* \*